US008356591B2

United States Patent
Plotkin et al.

(10) Patent No.: US 8,356,591 B2
(45) Date of Patent: Jan. 22, 2013

(54) CORNER STRUCTURE FOR WALLS OF PANELS IN SOLAR BOILERS

(75) Inventors: Andrew Plotkin, Worcester, MA (US); Russell Ricci, Brookfield, MA (US)

(73) Assignee: Babcock Power Services, Inc., Worcester, MA (US)

( * ) Notice: Subject to any disclaimer, the term of this patent is extended or adjusted under 35 U.S.C. 154(b) by 446 days.

(21) Appl. No.: 12/617,054

(22) Filed: Nov. 12, 2009

(65) Prior Publication Data

US 2010/0199979 A1 Aug. 12, 2010

Related U.S. Application Data

(60) Provisional application No. 61/151,984, filed on Feb. 12, 2009, provisional application No. 61/152,011, filed on Feb. 12, 2009, provisional application No. 61/152,035, filed on Feb. 12, 2009, provisional application No. 61/152,049, filed on Feb. 12, 2009, provisional application No. 61/152,077, filed on Feb. 12, 2009, provisional application No. 61/152,114, filed on Feb. 12, 2009, provisional application No. 61/152,286, filed on Feb. 13, 2009.

(51) Int. Cl.
*F24J 2/46* (2006.01)
*F24J 2/24* (2006.01)
*F03G 6/00* (2006.01)
(52) U.S. Cl. .............. 126/704; 126/663; 60/641.11
(58) Field of Classification Search ............. 126/663, 126/704; 60/641.11
See application file for complete search history.

(56) References Cited

U.S. PATENT DOCUMENTS

| 2,383,234 A | 8/1945 | Barnes |
| 3,197,343 A | 7/1965 | Palmatier |
| 3,208,877 A | 9/1965 | Merry |
| 3,325,312 A | 6/1967 | Sonntag, Jr. |
| 3,450,192 A | 6/1969 | Hay |
| 3,459,597 A | 8/1969 | Baron |
| 3,464,402 A | 9/1969 | Collura |

(Continued)

FOREIGN PATENT DOCUMENTS

DE 10248068 A1 * 5/2004

(Continued)

OTHER PUBLICATIONS

U.S. Appl. No. 60/943,093, Kroizer.

(Continued)

*Primary Examiner* — Kenneth Rinehart
*Assistant Examiner* — William Corboy
(74) *Attorney, Agent, or Firm* — Edwards Wildman Palmer LLP; Joshua L. Jones

(57) ABSTRACT

A boiler for a solar receiver includes a first wall of substantially coplanar side by side boiler panels. A plurality of contiguous panels of the first wall each have an inlet header thereof at a common first wall header elevation. A second wall includes substantially coplanar side by side boiler panels. A plurality of contiguous panels of the second wall each have an inlet header thereof at a common second wall header elevation. The second wall is adjacent to and angled with respect to the first wall so that one end panel of the first wall is adjacent to one end panel of the second wall to form a boiler wall corner. The inlet headers of the two end panels of the boiler wall corner are at different elevations relative to one another.

14 Claims, 7 Drawing Sheets

U.S. PATENT DOCUMENTS

| | | |
|---|---|---|
| 3,822,692 A | 7/1974 | Demarest |
| 3,823,703 A | 7/1974 | Lanciault |
| 3,893,506 A | 7/1975 | Laing |
| 3,924,604 A | 12/1975 | Anderson |
| 3,927,659 A | 12/1975 | Blake et al. |
| 3,951,108 A | 4/1976 | Rees |
| 3,968,652 A | 7/1976 | Chevalier |
| 3,991,742 A | 11/1976 | Gerber |
| 3,995,804 A | 12/1976 | Folds et al. |
| 4,003,366 A | 1/1977 | Lightfoot |
| 4,037,639 A | 7/1977 | Jones |
| 4,088,266 A | 5/1978 | Keyes |
| 4,094,147 A | 6/1978 | Alleau et al. |
| 4,112,921 A | 9/1978 | MacCracken |
| 4,120,288 A | 10/1978 | Barrett |
| 4,127,102 A | 11/1978 | Berman |
| 4,127,103 A | 11/1978 | Klank et al. |
| 4,128,096 A | 12/1978 | Katz |
| 4,136,674 A | 1/1979 | Korr |
| 4,191,246 A | 3/1980 | Cassell |
| 4,204,523 A | 5/1980 | Rothe |
| 4,205,658 A | 6/1980 | Clark |
| 4,210,122 A | 7/1980 | Artweger |
| 4,215,676 A | 8/1980 | Gilliam |
| 4,237,861 A | 12/1980 | Fayard et al. |
| 4,245,618 A | 1/1981 | Wiener |
| 4,253,801 A | 3/1981 | O'Hare |
| 4,257,477 A | 3/1981 | Maloney |
| 4,261,330 A | 4/1981 | Reinisch |
| 4,265,223 A | 5/1981 | Miserlis et al. |
| 4,269,172 A | 5/1981 | Parker et al. |
| 4,273,100 A | 6/1981 | Cogliano |
| 4,280,483 A | 7/1981 | Schaffer |
| 4,289,114 A | 9/1981 | Zadiraka |
| 4,296,730 A | 10/1981 | Zadiraka |
| 4,296,733 A | 10/1981 | Saunders |
| 4,312,687 A | 1/1982 | Sigworth, Jr. |
| 4,313,304 A | 2/1982 | Hunt |
| 4,320,663 A | 3/1982 | Francia |
| 4,324,229 A | 4/1982 | Risser |
| 4,338,991 A | 7/1982 | Sigworth, Jr. |
| 4,350,374 A | 9/1982 | Brollo |
| 4,353,356 A | 10/1982 | Vandenbossche |
| 4,359,043 A | 11/1982 | Dominique et al. |
| 4,367,726 A | 1/1983 | Maes, Jr. |
| 4,371,035 A | 2/1983 | Soligno |
| 4,373,512 A | 2/1983 | Hirt |
| 4,380,996 A | 4/1983 | Mengeringhausen |
| 4,384,550 A | 5/1983 | Miller |
| 4,394,859 A | 7/1983 | Drost |
| 4,404,960 A | 9/1983 | Laing |
| 4,416,265 A | 11/1983 | Wallace |
| 4,428,361 A | 1/1984 | Straza |
| 4,432,341 A | 2/1984 | Howe et al. |
| 4,454,863 A | 6/1984 | Brown et al. |
| 4,485,803 A | 12/1984 | Wiener |
| 4,503,903 A | 3/1985 | Kramer |
| 4,512,336 A | 4/1985 | Wiener |
| 4,535,755 A | 8/1985 | Roberts |
| 4,569,331 A | 2/1986 | Tani et al. |
| 4,615,381 A | 10/1986 | Maloney |
| 4,653,470 A | 3/1987 | Carli et al. |
| 4,660,630 A | 4/1987 | Cunningham et al. |
| 4,665,894 A | 5/1987 | Juhasz |
| 4,712,338 A | 12/1987 | Trickel |
| 4,768,345 A | 9/1988 | Kardas |
| 4,832,119 A | 5/1989 | Bloor et al. |
| 4,867,133 A | 9/1989 | Sadler |
| 4,946,512 A | 8/1990 | Fukuroi et al. |
| 4,972,806 A | 11/1990 | Marsault |
| 5,163,821 A | 11/1992 | Kelly et al. |
| 5,174,128 A | 12/1992 | Bourne et al. |
| 5,201,282 A | 4/1993 | Albrecht |
| 5,217,000 A | 6/1993 | Pierce-Bjorklund |
| 5,342,016 A | 8/1994 | Marsault et al. |
| 5,368,092 A | 11/1994 | Rearden et al. |
| 5,404,937 A | 4/1995 | Assaf et al. |
| 5,417,052 A | 5/1995 | Bharathan et al. |
| 5,444,972 A | 8/1995 | Moore |
| 5,482,233 A | 1/1996 | Marko et al. |
| 5,694,774 A | 12/1997 | Drucker |
| 5,727,379 A | 3/1998 | Cohn |
| 5,823,176 A | 10/1998 | Harris |
| 5,850,831 A | 12/1998 | Marko |
| 5,857,322 A | 1/1999 | Cohn |
| 5,862,800 A | 1/1999 | Marko |
| 5,881,456 A | 3/1999 | Bergins et al. |
| 5,943,985 A | 8/1999 | Hartman |
| 6,126,120 A | 10/2000 | Quaranta et al. |
| 6,155,339 A | 12/2000 | Grapengater |
| 6,173,927 B1 | 1/2001 | Delsol |
| 6,240,156 B1 | 5/2001 | Matsumoto et al. |
| 6,301,928 B1 | 10/2001 | Tanatsugu et al. |
| 6,434,942 B1 | 8/2002 | Charlton |
| 6,487,859 B2 | 12/2002 | Mehos et al. |
| 6,497,102 B2 | 12/2002 | Liebig |
| 6,532,953 B1 | 3/2003 | Blackmon et al. |
| 6,668,555 B1 | 12/2003 | Moriarty |
| 6,708,687 B2 | 3/2004 | Blackmon, Jr. et al. |
| 6,736,134 B2 | 5/2004 | Marko |
| 6,913,015 B2 | 7/2005 | Pajk |
| 6,926,440 B2 | 8/2005 | Litwin |
| 6,931,851 B2 | 8/2005 | Litwin |
| 7,011,086 B2 | 3/2006 | Litwin |
| 7,600,350 B2 | 10/2009 | Braunstein |
| 7,640,746 B2 | 1/2010 | Skowronski et al. |
| 7,806,377 B2 | 10/2010 | Strizki |
| 2001/0010222 A1 | 8/2001 | Prueitt |
| 2002/0029869 A1 | 3/2002 | Kodumudi et al. |
| 2003/0041856 A1 | 3/2003 | Blackmon et al. |
| 2004/0035111 A1 | 2/2004 | Ven et al. |
| 2004/0112374 A1 | 6/2004 | Litwin |
| 2004/0139961 A1 | 7/2004 | Blackmon et al. |
| 2004/0244376 A1 | 12/2004 | Litwin et al. |
| 2004/0251002 A1 | 12/2004 | Reichle et al. |
| 2004/0255571 A1 | 12/2004 | Fetescu et al. |
| 2005/0016524 A1 | 1/2005 | Broatch |
| 2006/0225863 A1 | 10/2006 | Levin |
| 2006/0260314 A1 | 11/2006 | Kincaid et al. |
| 2007/0089775 A1 | 4/2007 | Lasich |
| 2007/0119718 A1 | 5/2007 | Gibson et al. |
| 2007/0227531 A1 | 10/2007 | Garcia Cors et al. |
| 2007/0295382 A1 | 12/2007 | Oak |
| 2008/0000231 A1 | 1/2008 | Litwin et al. |
| 2008/0022685 A1 | 1/2008 | Zhu |
| 2008/0053523 A1 | 3/2008 | Brown et al. |
| 2008/0078378 A1 | 4/2008 | Zhu |
| 2008/0092551 A1 | 4/2008 | Skowronski |
| 2008/0256953 A1 | 10/2008 | Arkas et al. |
| 2008/0302357 A1 | 12/2008 | DeNault |
| 2009/0014057 A1 | 1/2009 | Croft et al. |
| 2009/0101134 A1 | 4/2009 | Merrett |
| 2009/0107146 A1 | 4/2009 | Lin |
| 2009/0114269 A1 | 5/2009 | Fletcher et al. |
| 2009/0114270 A1 | 5/2009 | Stancel |
| 2009/0199557 A1 | 8/2009 | Bennett |
| 2009/0250051 A1 | 10/2009 | Lata Perez |
| 2009/0260359 A1 | 10/2009 | Palkes |
| 2009/0276993 A1 | 11/2009 | Fedock et al. |
| 2010/0101564 A1* | 4/2010 | Iannacchione et al. ....... 126/680 |
| 2010/0229853 A1 | 9/2010 | Vandal et al. |
| 2010/0236183 A1 | 9/2010 | Cusson et al. |

FOREIGN PATENT DOCUMENTS

| | | |
|---|---|---|
| FR | 2501839 A1 | 9/1982 |
| JP | 53131309 A | 11/1978 |
| JP | 08326223 A | 12/1996 |
| WO | WO-2008154599 A1 | 12/2008 |

OTHER PUBLICATIONS

International Search Report and Written Opinion, dated Aug. 30, 2010 for PCT/US2010/023124.

International Search Report and Written Opinion, dated Aug. 31, 2010 for PCT/US2010/023165.

International Search Report and Written Opinion, dated Oct. 13, 2010 for PCT/US2010/023622.

International Search Report and Written Opinion, dated Oct. 13, 2010 for PCT/US2010/023826.

International Search Report and Written Opinion, dated Dec. 13, 2010 for PCT/US2010/023367.

International Search Report and Written Opinion, dated Dec. 13, 2010 for PCT/US2010/023500.

* cited by examiner

CORNER STRUCTURE FOR WALLS OF PANELS IN SOLAR BOILERS

CROSS-REFERENCE TO RELATED APPLICATIONS

This application claims priority to U.S. Provisional application No. 61/151,984, filed Feb. 12, 2009, to U.S. Provisional application No. 61/152,011, filed Feb. 12, 2009, to U.S. Provisional application No. 61/152,035, filed Feb. 12, 2009, to U.S. Provisional application No. 61/152,049, filed Feb. 12, 2009, to U.S. Provisional application No. 61/152,077, filed Feb. 12, 2009, to U.S. Provisional application No. 61/152,114, filed Feb. 12, 2009, and to U.S. Provisional application No. 61/152,286, filed Feb. 13, 2009, each of which is incorporated by reference herein in its entirety.

BACKGROUND OF THE INVENTION

1. Field of the Invention

The present invention relates to solar power production, and more particularly, to solar receiver panels for use in solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be utilized without creating nuclear waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt because it has the ability to store energy, allowing power generation when there is no solar radiation. The heated working fluids are typically conveyed to a heat exchanger where they release heat into a second working fluid such as air, water, or steam. Power is generated by driving heated air or steam through a turbine that drives an electrical generator.

More recently, it has been determined that solar power production can be increased and simplified by using water/steam as the only working fluid in a receiver that is a boiler. This can eliminate the need for an inefficient heat exchanger between two different working fluids. This development has lead to new challenges in handling the intense solar heat without damage to the system. One such challenge involves the fact that in order to maximize power output, heliostat fields are typically arranged to surround a central receiver tower so the boiler on the tower can receive solar energy from all around.

Typical boilers include two or more sections at different temperatures and pressures, such as a section of steam generator panels, a section of superheater panels, and a section of reheater panels, for example. Each section typically includes multiple receiver panels each having a series of tubes running from a common inlet header to a common outlet header. In high capacity solar boilers, there is typically a field of heliostats surrounding the boiler on all sides. Typical solar boilers are built to be generally circular so as to be able to collect sunlight from heliostats on all sides. Due to the round configuration, the headers of the panels constructed in the conventional manner tend to limit the proximity possible from panel to panel. This causes vertical gaps between the individual panels due to the slight angle between adjacent panels needed for the round configuration.

One approach to this problem is to stager the individual panels at different heights around the boiler so the headers do not interfere with each other. This allows the panels to be arranged more tightly together, without significant vertical gaps therebetween. However, if multiple boiler sections, e.g., a steam generator and a superheater, were arranged vertically in a stack, the staggered approach would increase the horizontal gap between the sections because of the extra space needed to stagger the headers. Still another approach is to bevel the headers of individual panels to reduce vertical gaps between the panels, but even this approach would leave a horizontal gap between stacked boiler sections where the headers are located. Gaps in the receiver area of a boiler constitute area where available sunlight from the heliostats is not captured. In typical solar boilers with horizontal gaps between vertically stacked sections, the gaps must be covered with a shielding panel which blocks concentrated sunlight from the heliostats. The blocked concentrated sunlight is thus not made available for power production.

While the known systems of solar power production have generally been considered satisfactory for their intended purposes, there has remained a need in the art for solar receivers that can improve the overall efficiency and capture more of the solar power made available by heliostats by reducing or eliminating gaps between receiver sections. There also has remained a need in the art for such solar receivers that are easy to make and use. The present invention provides a solution to these problems.

SUMMARY OF THE INVENTION

The subject invention is directed to a new and useful boiler for a solar receiver. The boiler includes a first wall of substantially coplanar side by side boiler panels. Each panel of the first wall includes an inlet header at one end thereof and an outlet header at an opposed end thereof. A plurality of contiguous panels of the first wall each have an inlet header thereof at a common first wall header elevation.

The boiler also includes a second wall of substantially coplanar side by side boiler panels. Each panel of the second wall includes an inlet header at one end thereof and an outlet header at an opposed end thereof. A plurality of contiguous panels of the second wall each have an inlet header thereof at a common second wall header elevation. The second wall is adjacent to and angled with respect to the first wall so that one end panel of the first wall is adjacent to one end panel of the second wall to form a boiler wall corner. The inlet headers of the two end panels of the boiler wall corner are at different elevations relative to one another.

In accordance with certain embodiments, the inlet header of the end panel of the first wall is at a different elevation from the common first wall header elevation. The inlet header of the end panel of the second wall can be at the common second wall header elevation. The common second wall header elevation can be the same as or different from the common first wall header elevation. It is also contemplated that the inlet header of the end panel of the second wall can be at a different elevation from the common second wall header elevation.

In certain embodiments, the inlet header of the end panel of the first wall is at the common first wall header elevation. It is also contemplated that the inlet header of the end panel of the second wall can be at the common second wall header elevation.

In certain embodiments, the first and second boiler walls each include upper and lower vertically stacked boiler sections. A plurality of contiguous panels of each wall of the lower section overlap a plurality of contiguous panels of each wall of the upper section. The outlet headers of the contiguous panels of each lower section are proximate to the inlet headers of the contiguous panels of each upper section to form a header section of the first boiler wall at a first common header elevation and a header section of the second boiler wall at a second common header elevation. The second boiler wall is adjacent to and angled with respect to the first boiler wall so that one end panel of each of the upper and lower sections of the first boiler wall is adjacent to a respective upper and lower end panel of the second boiler wall to form a boiler wall corner. Adjacent headers of the end panels of the first boiler wall are at a different elevation from adjacent headers of the end panels of the second boiler wall.

The invention also includes a boiler for a solar receiver including vertically stacked quadrilateral superheater, steam generator, and reheater sections. The quadrilateral superheater includes four substantially planar superheater walls. Each superheater wall includes a plurality of substantially coplanar side by side boiler panels. The four superheater walls form four corners. At each corner, adjacent corner panels of two superheater walls form a corner of the superheater.

The quadrilateral steam generator includes four substantially planar steam generator walls. Each steam generator wall is substantially coplanar with and overlaps a lower end of a respective one of the four superheater walls. The four steam generator walls form four corners. At each corner, adjacent corner panels of two steam generator walls form a corner of the steam generator.

The quadrilateral reheater includes four substantially planar reheater walls. Each reheater wall is substantially coplanar with and overlaps a lower end of a respective one of the four steam generator walls. The four reheater walls form four corners. At each corner, adjacent corner panels of two reheater walls form a corner of the reheater.

Each panel of the superheater, steam generator, and reheater includes an inlet header at one end thereof and an outlet header at an opposed end thereof. A plurality of contiguous panels of each wall have adjacent headers thereof at a common elevation with respect one to another. Adjacent headers of the two corner panels at each corner of the superheater, steam generator, and reheater are at two different elevations relative to one another.

In certain embodiments, the inlet header of each of two corner panels of each of the superheater, steam generator, and reheater is at a different elevation from the common elevation of the contiguous panels of its respective wall. The inlet header of each of two corner panels of each of the superheater, steam generator, and reheater can be at the common elevation of the contiguous panels of its respective wall. The common elevation can be the same for all four superheater walls. The common elevation can be the same for all four steam generator walls. It is also contemplated that the common elevation can be the same for all four reheater walls.

In accordance with certain embodiments, the inlet header of each of four corner panels of each of the superheater, steam generator, and reheater is at a different elevation from the common elevation of the contiguous panels of its respective wall. Two walls of each of the superheater, steam generator, and reheater can each have two corner panels, the inlet header of each of which is at a different elevation from the common elevation of the contiguous panels of its respective wall. Two walls of each of the superheater, steam generator, and reheater can each have adjacent inlet headers of all panels including the corner panels and the contiguous panels at the common elevation thereof.

In certain embodiments, all of the panels of two opposed walls of each of the superheater, steam generator, and reheater, including corner panels and contiguous panels, have inlet headers at a first common elevation. All of the panels of two opposed walls of each of the superheater, steam generator, and reheater, including corner panels and contiguous panels, can have inlet headers at a second common elevation that is different from the first common elevation.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 2:
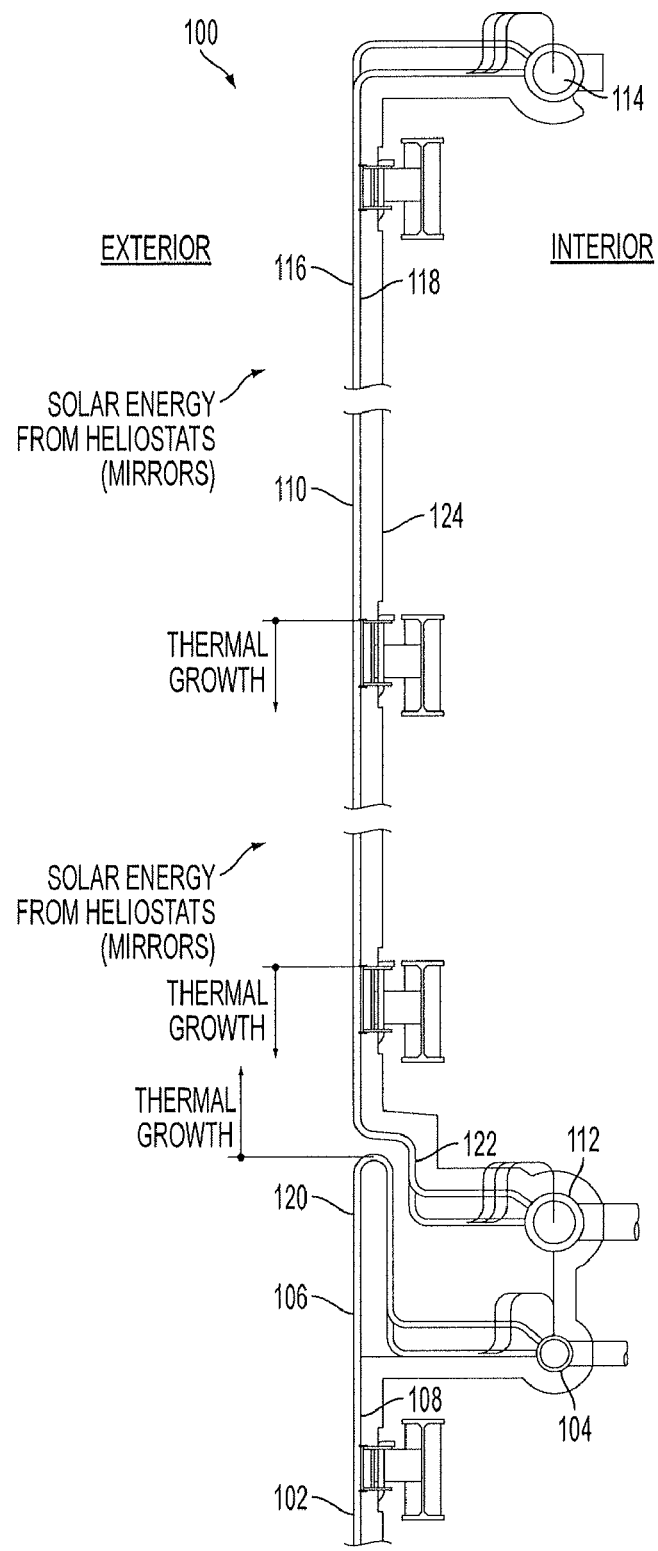
FIG. 2 is a side elevation view of a portion of an exemplary embodiment of a solar receiver panel constructed in accordance with the present invention, showing an overlapping header section including headers from two adjacent boiler sections.

Reference will now be made to the drawings wherein like reference numerals identify similar structural features or aspects of the subject invention. For purposes of explanation and illustration, and not limitation, a partial view of an exemplary embodiment of a boiler in accordance with the invention is shown in FIG. 2 and is designated generally by reference character 100. Other embodiments of a boiler in accordance with the invention, or aspects thereof, are provided in FIGS. 3-7, as will be described. The systems of the invention can be used to increase the effective receiving area while protecting internal spaces and components in boilers, for example in solar power generation.

Figure 1:
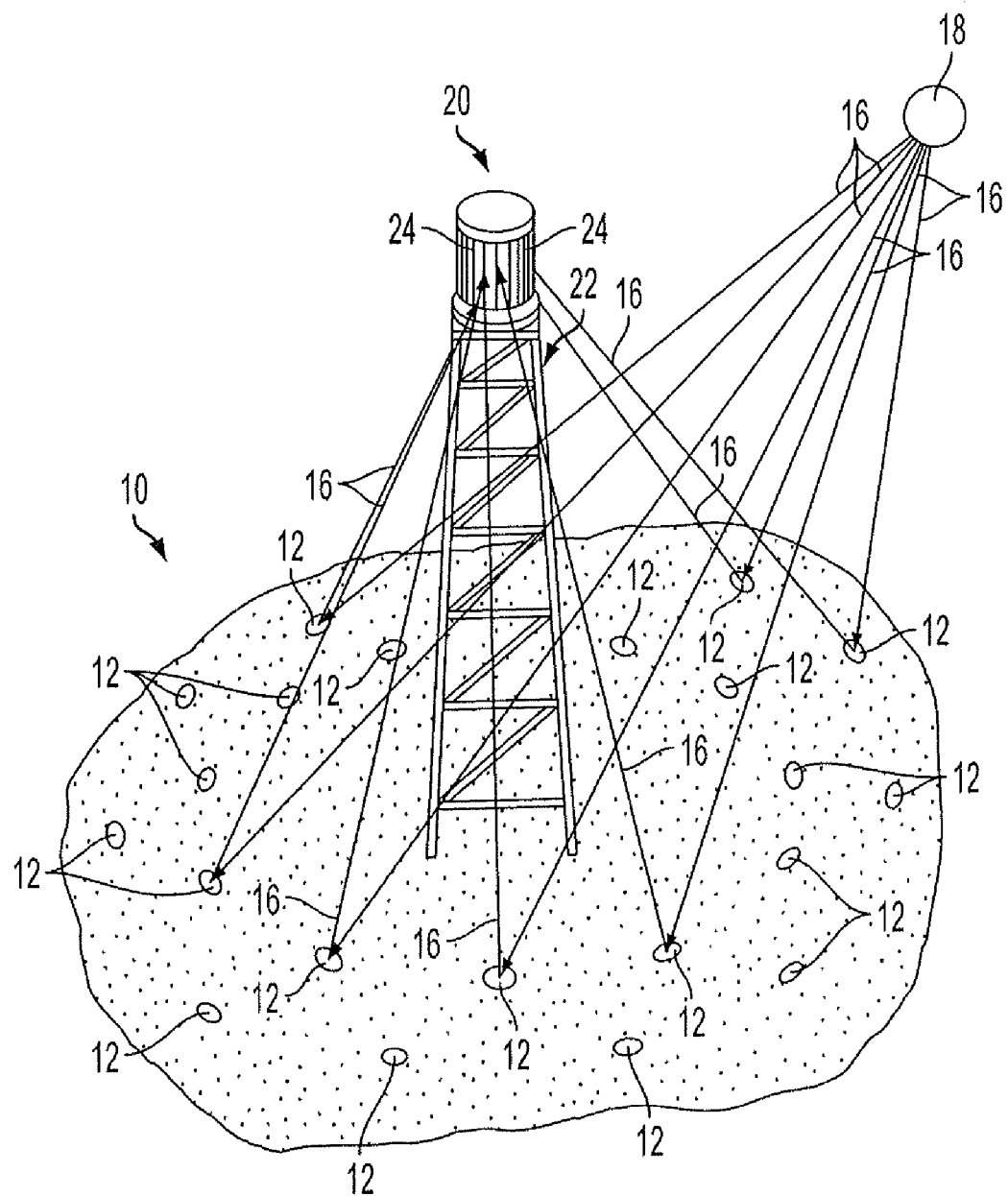
FIG. 1 is schematic perspective view of a prior art solar power system, showing a field of heliostats surrounding a central receiver power plant, with the heliostats directing solar radiation onto a receiver.

FIG. 1 shows a typical solar power generating system 10 in which a field of heliostats 12 surrounds a central receiver 20 on a tower 22. The heliostats 12 track the sun 18 so as to reflect solar radiation 16 and concentrate it on receiver panels 24 on receiver 20. Receiver 20 is generally cylindrical so as to be able to receive solar radiation from heliostats 12 on all sides of tower 22. Known receivers in which boiler panels are used to absorb the solar radiation have had vertical gaps between panels or sections of panels, horizontal gaps between boiler sections such as the steam generator section and the superheater section, or both. The gaps present drawbacks because if they are not somehow shielded from solar radiation passing therethrough (known as leakage), components internal to the panels can be damaged. The shielding covers portions of the receiving area and the solar radiation incident on the shielding is not utilized for power generation. The gaps translate into lost efficiency for the system.

One reason for the gaps is that typical boilers are arranged in such a way that the inlet and outlet locations of each section (steam generator, superheater, reheater, etc.) are at the same elevation. At the superheater inlet, for example, a row of headers, all at the same elevation, feeds steam to the superheater panels.

Typically this arrangement works well, however, in a multiple-sided boiler configuration an interference problem occurs when two wall sections come together at the corners. If all the headers are at the same elevation, the headers at the corner panels limit how closely the two wall sections can be joined at the corner, resulting in a vertical gap between the angled wall sections at the corner of the boiler, and/or a horizontal gap between vertical sections.

To address this limitation arising from gaps in conventional boilers, boiler 100 in accordance with the present invention has one of the sides of is corners with a staggered inlet and outlet location, that is, the elevations of the headers of the corner panels are offset with respect to one another, to prevent interference thereof. This type of configuration eliminates the need for complex piping arrangement and header locations to prevent header interference, while still allowing the panels to be vented and drained. It makes it possible for the entire outside area of the boiler to be available for receiving concentrated sunlight from heliostats, without headers and adjacent tubing being covered by protective shields. This translates into higher efficiency.

With reference now to FIG. 2, boiler 100 for a solar receiver includes a first boiler panel 102, of a steam generator section for example, having a plurality of tubes fluidly connecting an inlet header (not shown, but see, e.g., 112) of first boiler panel 102 to an outlet header 104 of first boiler panel 102. The tubes of first boiler panel 102 form a first solar receiver surface 106 and a first internal surface 108 opposite second solar receiver surface 106. The exterior receiver surface 106 receives solar energy, for example from a field of heliostats, as indicated by arrows in FIG. 2.

A second boiler panel 110, of a superheater section, for example, similarly includes a plurality of tubes fluidly connecting an inlet header 112 of second boiler panel 110 to an outlet header 114 of second boiler panel 110. The tubes of second boiler panel 110 form a second solar receiver surface 116 and a second internal surface 118 opposite the second solar receiver surface (i.e. exterior and interior surfaces, respectively, as indicated in FIG. 2). Like receiver surface 106, exterior receiver surface 116 receives solar energy, for example from a field of heliostats, as indicated by arrows in FIG. 2.

Figure 3:
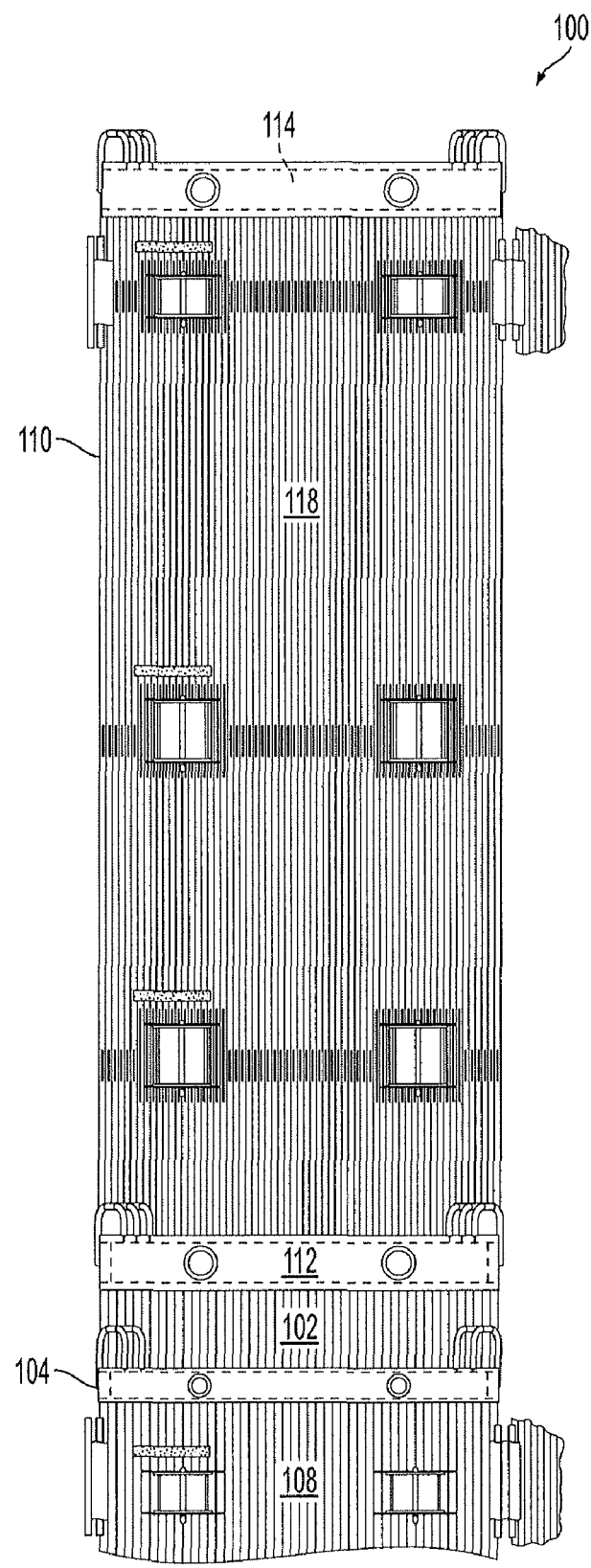
FIG. 3 is an interior elevation view of a portion of the solar receiver panel of FIG. 2, showing the tubing of the panels as well as the headers.

First and second boiler panels 102 and 110 are adjacent to one another with an end 120 of first solar receiver surface 106 overlapping an end 122 of second boiler panel 110 to reduce solar radiation passing between the first and second solar receiver surfaces 106 and 116. The interior surfaces have a layer of insulating material 124 to protect the interior space and components from the high external temperatures. FIG. 3 shows the same portion of boiler 100 from the interior, with insulating material 124 removed to show the tubes and headers.

Figure 4:
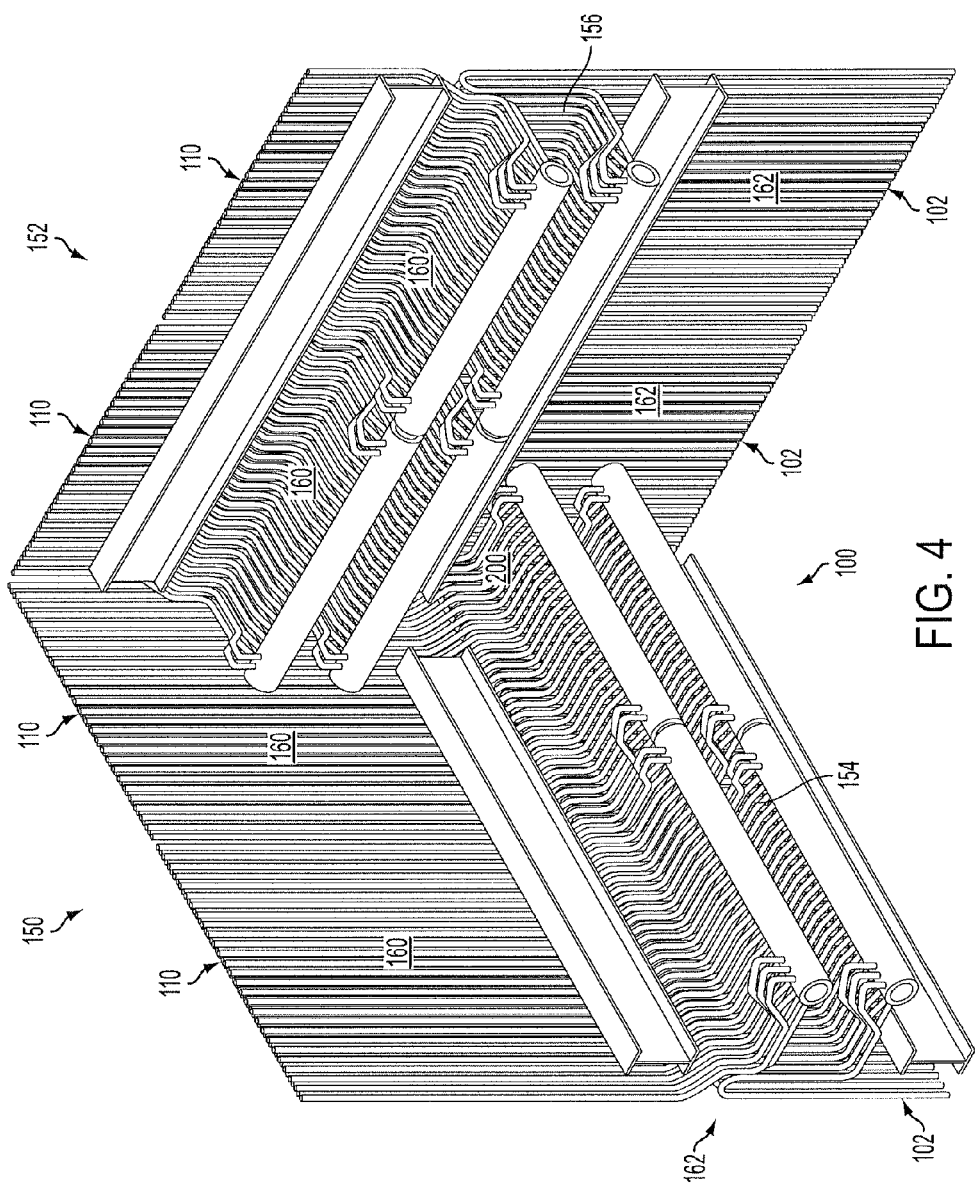
FIG. 4 is a perspective view of an interior portion of the solar boiler of FIG. 2, showing the corner overlap region formed where two boiler walls meet at an angle with overlapping header sections of the respective walls set at separate elevations.

FIG. 4 shows a corner portion of boiler 100 from the inside. Boiler 100 includes a first boiler section 160, such as a superheater, having a first wall 150 with a plurality of substantially coplanar, side by side tubing panels 110 and a first header section 154 at a first elevation including headers for the panels 110 of first wall 150. A second wall 152 is adjacent to first wall 150 and is at a right angle with respect thereto. Second wall 152 includes a plurality of substantially coplanar tubing panels 110 and a second header section 156 at a second elevation including headers for the panels 110 of second wall 152. An overlapping corner region 200 is formed wherein an end of the first header section 154 at the first elevation overlaps with an end of the second header section 156 at the second elevation so that first and second walls 150 and 152 form a corner in the first boiler section 160 (e.g., a corner in the superheater).

With continued reference to FIG. 4, boiler 100 further includes a second boiler section 162, such as a steam generator, also forming part of first and second walls 150 and 152 like those of section 160 described above. Overlapping corner regions 200 of the first and second boiler sections 160 and 162 are aligned to form one corner of boiler 100. As depicted in FIG. 4, the header sections 154 and 156 of walls 150 and 152 (which includes headers for the superheater and steam generator, for example, due to the vertically overlapping panel arrangement discussed above) do not interfere with one another, and there is no significant vertical gap at the corner of boiler 100 where walls 150 and 152 meet. Nor is there a significant horizontal gap between the sections 160 and 162.

As can be seen in FIG. 4, small vertical gaps can be left between adjacent panels 102 and 110 so as to provide room for lateral thermal expansion when the panels are heated to operating temperatures. As can also be seen in FIGS. 2-4, very little tube bending is required to accomplish the corner arrangement. As can be seen in FIG. 4, some of the edge tubes of each panel near the header are bent slightly toward the center of the panel, allowing the tubes to join the header at the top, for example, which reduces the overall length of each header so that multiple adjacent headers can be at the same elevation without extra spacing between panels to accommodate the width of the headers. This approach can be applied with any suitable number of panels in each wall of each section. For example, each side of each section can be a wall of eight individual panels. Those skilled in the art will readily appreciate that any other suitable number of panels can be used without departing from the spirit and scope of the invention.

Figure 5:
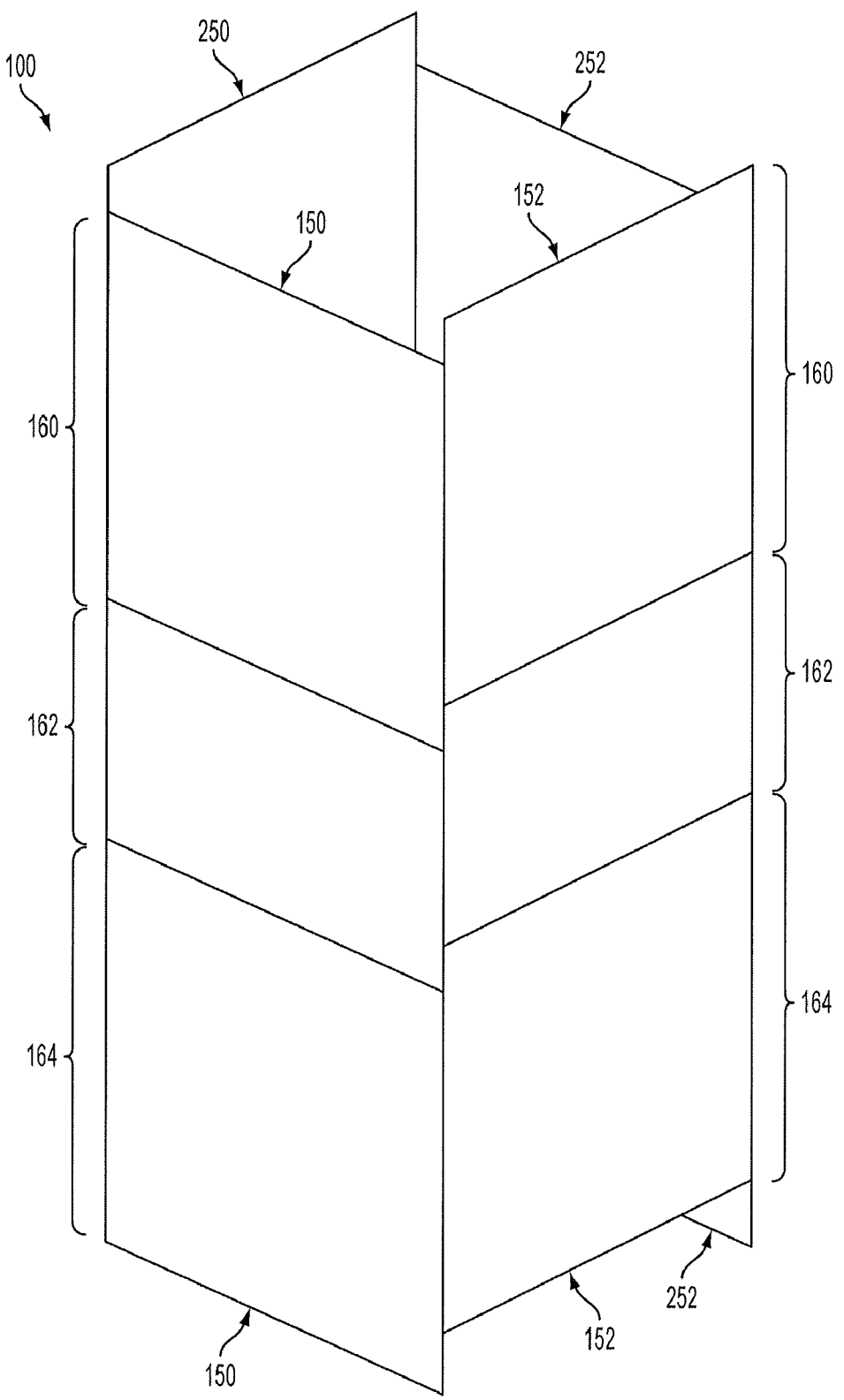
FIG. 5 is a schematic perspective view of an exterior portion of the solar boiler of FIG. 2, showing the vertical staggered arrangement of three boiler sections in the four-sided boiler.

Referring now to FIG. 5, first and second boiler sections 160 and 162 can each include third walls 250 and fourth walls 252, wherein the first, second, third, and fourth walls 150, 152, 252, and 250 of the first and second boiler sections 160 and 162 are arranged to form a four-sided boiler 100 wherein the walls of the first boiler section 160 are substantially coplanar with the walls of second boiler section 162. Boiler 100 also includes a third section 164, a reheater section for example, configured in the same manner as sections 160 and 162. Those skilled in the art will readily appreciate that any suitable number of boiler sections can be included. Those skilled in the art will also readily appreciate that while boiler 100 has been shown with an exemplary four-sided configuration any suitable number of sides can be used without departing from the spirit and scope of the invention. Also, while described above in the context of an exemplary boiler having a superheater above a steam generator above a reheater, any suitable sections, number of sections, or order of sections can be used without departing from the spirit and scope of the invention. The walls and sections of boiler 100 are arranged so as to protect the interior space from solar radiation leakage, accommodate thermal expansion and contraction of the panels, and utilize the whole solar receiver area without significant waste of solar energy resulting from shielding or gaps as in the conventional boilers.

Figure 6:
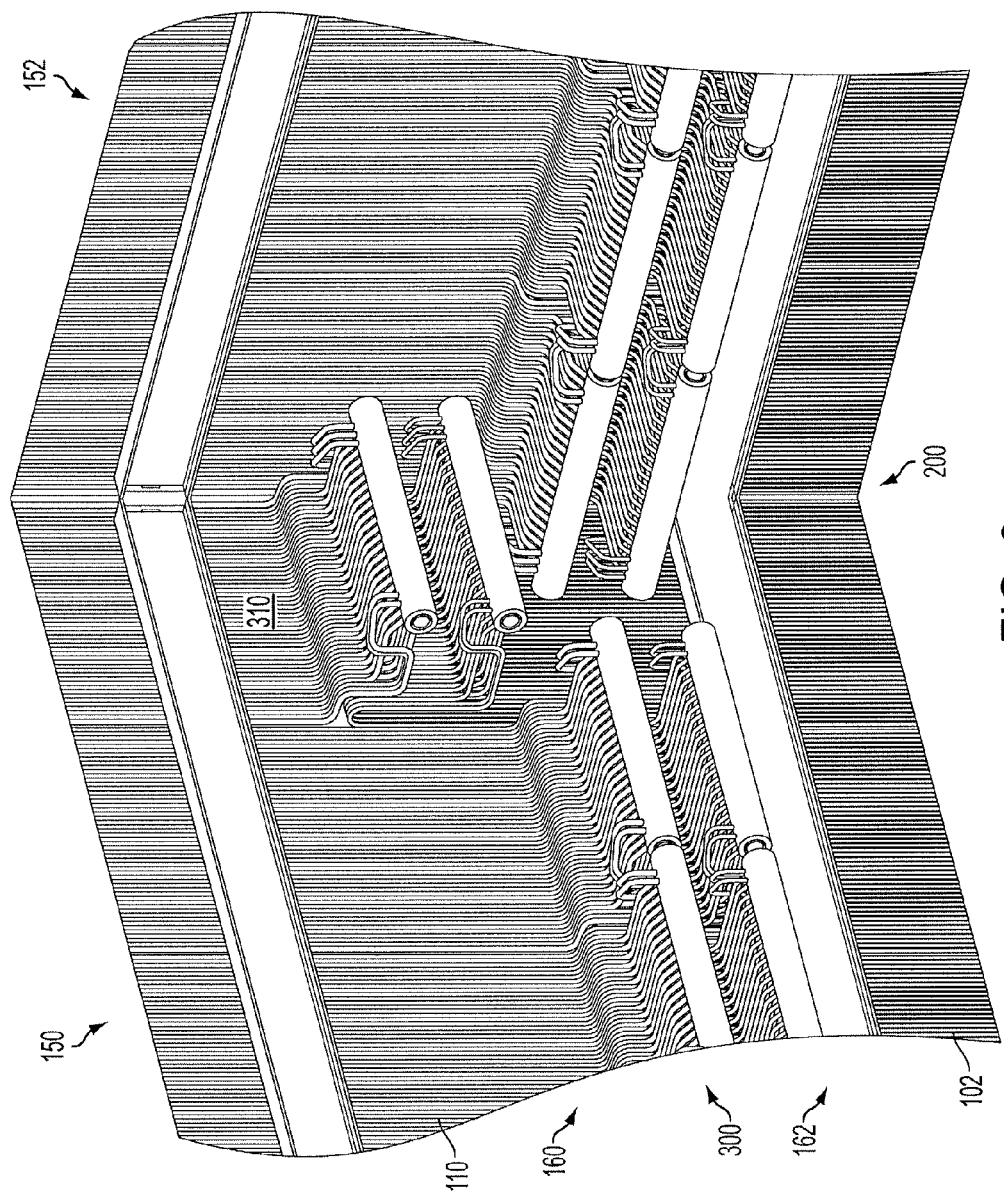
FIG. 6 is a perspective view of an interior portion of another exemplary embodiment of a solar boiler constructed in accordance with the present invention, showing the corner overlap region formed where two boiler walls meet at an angle with overlapping header sections wherein the corner panel of one of the walls is at a separate elevation from the other panels.
Figure 7:
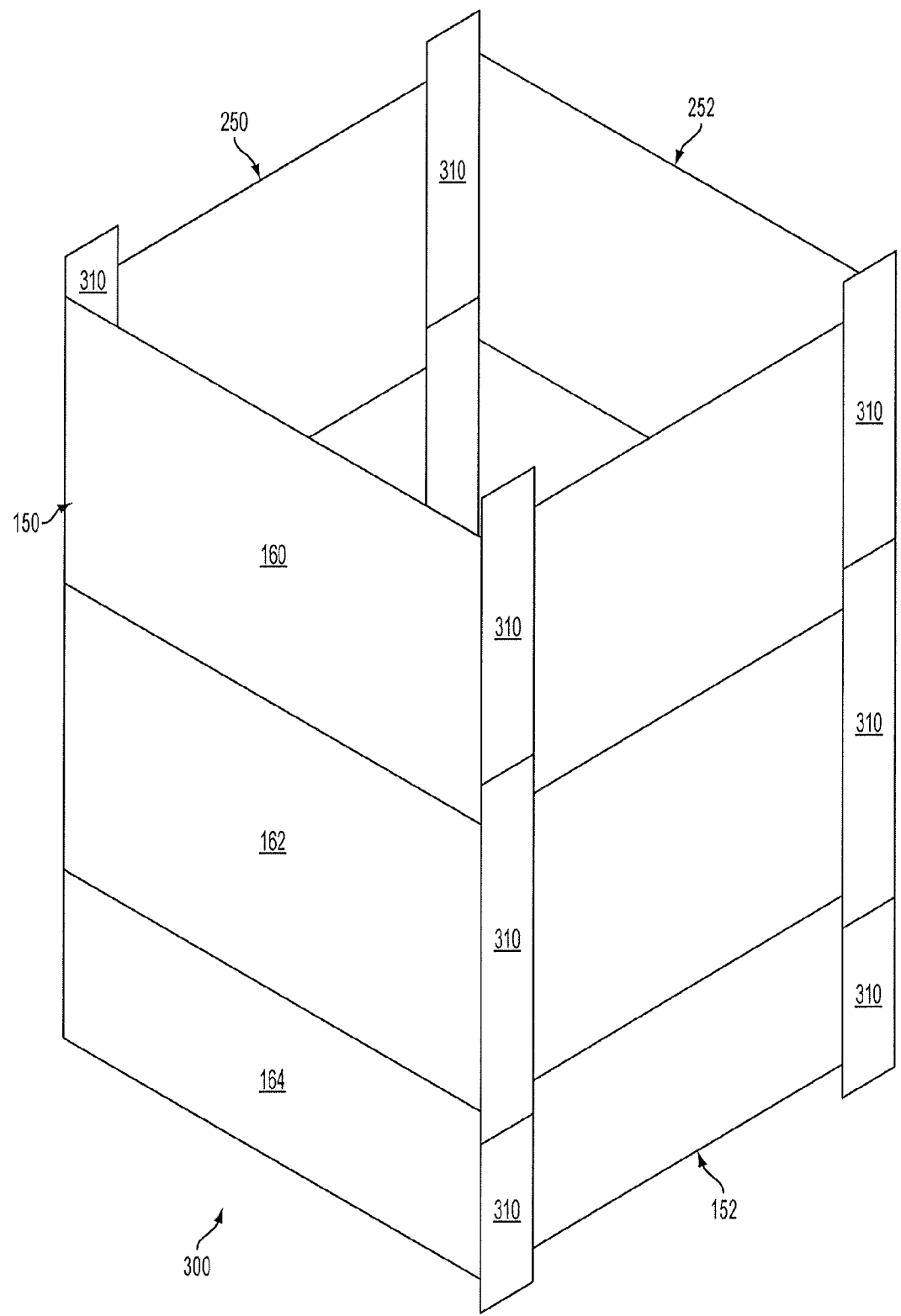
FIG. 7 is a schematic perspective view of an exterior portion of the solar boiler of FIG. 6, showing the vertical staggered arrangement of three boiler sections in the four-sided boiler in which the corner panels on two sides of the boiler are staggered.

FIGS. 6-7 show another embodiment of a solar boiler 300 constructed in accordance with the present invention, with a quadrilateral steam generator 162, superheater 160, and reheater 164 vertically stacked and aligned as described above. As can be seen in FIGS. 6-7, only the corner panels 310 on two sides of the boiler are staggered.

Referring to FIG. 7, opposed walls 150 and 252 do not include any staggered panels, rather, the headers of the panels of walls 150 and 252 are all at the same common elevation relative to one another, and this applies to all three stacked sections of boiler 300. Opposed walls 250 and 152, on the other hand, have each corner panel 310 staggered with its headers at different elevations from the respective header elevation for each section 160, 162, and 164.

It is also possible for each of the four walls of each section 160, 162, and 164 to include one corner panel 310 that is vertically offset relative to its neighboring panels. In FIG. 6, all of the panels except one corner panel 310 of each section 160 and 162 have their headers at a common header elevation. Corner panels 310 are offset from the common header elevation to prevent interference of headers at the corner of boiler sections 160 and 162.

With continued reference to FIG. 6, it is also possible to have headers of both corner panels at a corner of two wall sections be offset with respect to the headers of the contiguous panels of their respective section 160, 162, and 164. For Example, rather than having one corner panel 310 offset the full distance shown in FIG. 6, both corner panels could instead be offset half the distance shown in FIG. 6, one upward and the other downward. The staggering of panels in the embodiments described herein are exemplary, and those skilled in the art will readily appreciate that any suitable staggering scheme of panels can be used to accommodate the corners of a solar boiler without departing from the spirit and scope of the invention.

The staggered corner panels 310 of steam generator 162 in FIG. 7 are longer than the rest of the steam generator panels. The extended panels have little or no effect on temperature control for two reasons. First, the outside edges of boiler 300 tend to receive substantially less heat than the middle panels, since the main focus of the solar energy is on the centers of the boiler walls. Second, the heliostat mirrors are able to be controlled so accurately that they can be aimed to accommodate a wide variety of receiver sizes or shapes as needed.

The methods and systems of the present invention, as described above and shown in the drawings provide for increased effective area for receiving solar radiation in a boiler, such as in a solar receiver. This configuration provides improved efficiency while also providing protection of components and spaces internal to the receiver panels from spillage of solar radiation from the heliostats, while allowing for thermal expansion and contraction of the boiler sections.

While the apparatus and methods of the subject invention have been shown and described with reference to preferred embodiments, those skilled in the art will readily appreciate that changes and/or modifications may be made thereto without departing from the spirit and scope of the invention.

What is claimed is:

1. A boiler for a solar receiver comprising:
a) a first boiler wall including upper and lower vertically stacked boiler sections, each boiler section including substantially coplanar side by side boiler panels, each panel of the first wall including an inlet header at one end thereof and an outlet header at an opposed end thereof, a plurality of contiguous panels of the lower section overlapping a plurality of contiguous panels of the upper section, the outlet headers of the contiguous panels of the lower section being proximate to the inlet headers of the contiguous panels of the upper section to fours a header section of the first boiler wall at a first common header elevation; and
b) a second boiler wall including upper and lower vertically stacked boiler sections, each boiler section including substantially coplanar side by side boiler panels, each panel of the second wall including an inlet header at one end thereof and an outlet header at an opposed end thereof, a plurality of contiguous panels of the lower section overlapping a plurality of contiguous panels of the upper section, the outlet headers of the contiguous panels of the lower section being proximate to the inlet headers of the contiguous panels of the upper section to form a header section of the second boiler wall at a second common header elevation, wherein the second boiler wall is adjacent to and angled with respect to the first boiler wall so that one end panel of each of the upper and lower sections of the first boiler wall is adjacent to a respective upper and lower end panel of the second boiler wall to form a boiler wall corner, wherein adjacent headers of the end panels of the first boiler wall are at a different elevation from adjacent headers of the end panels of the second boiler wall.

2. A boiler as recited in claim 1, wherein the adjacent headers of the end panels of the first boiler wall are at a different elevation from the common first wall header elevation.

3. A boiler as recited in claim 2, wherein the adjacent headers of the end panels of the second boiler wall are at the common second wall header elevation.

4. A boiler as recited in claim 3, wherein the common second wall header elevation is the same as the common first wall header elevation.

5. A boiler as recited in claim 2, wherein the adjacent headers of the end panels of the second boiler wall are at a different elevation from the common second wall header elevation.

6. A boiler as recited in claim 1, wherein the adjacent headers of the end panels of the first boiler wall are at the common first wall header elevation, and wherein the adjacent headers of the end panels of the second boiler wall are at the common second wall header elevation.

7. A boiler for a solar receiver comprising:
a) a quadrilateral superheater including four substantially planar superheater walls, each superheater wall including a plurality of substantially coplanar side by side boiler panels, the four superheater walls forming four corners wherein at each corner, adjacent corner panels of two superheater walls form a corner of the superheater;
b) a quadrilateral steam generator including four substantially planar steam generator walls, each steam generator wall being substantially coplanar with and overlapping a lower end of a respective one of the four superheater walls, the four steam generator walls forming four corners wherein at each corner, adjacent corner panels of two steam generator walls form a corner of the steam generator;
c) a quadrilateral reheater including four substantially planar reheater walls, each reheater wall being substantially coplanar with and overlapping a lower end of a respective one of the four steam generator walls, the four reheater walls forming four corners wherein at each corner, adjacent corner panels of two reheater walls form a corner of the reheater; and
d) each panel of the superheater, steam generator, and reheater including an inlet header at one end thereof and an outlet header at an opposed end thereof, a plurality of contiguous panels of each wall having adjacent headers thereof at a common elevation with respect one to another, wherein adjacent headers of the two corner panels at each corner of the superheater, steam generator, and reheater are at two different elevations relative to one another.

8. A boiler as recited in claim 7, wherein the inlet header of each of two corner panels of each of the superheater, steam generator, and reheater is at a different elevation from the common elevation of the contiguous panels of its respective wall.

9. A boiler as recited in claim 8, wherein the inlet header of each of two corner panels of each of the superheater, steam generator, and reheater is at the common elevation of the contiguous panels of its respective wall.

10. A boiler as recited in claim 9, wherein the common elevation is the same for all four superheater walls, wherein the common elevation is the same for all four steam generator walls, and wherein the common elevation is the same for all four reheater walls.

11. A boiler as recited in claim 9, wherein the inlet header of each of four corner panels of each of the superheater, steam generator, and reheater is at a different elevation from the common elevation of the contiguous panels of its respective wall.

12. A boiler as recited in claim 11, wherein two walls of each of the superheater, steam generator, and reheater each have two corner panels, the inlet header of each of which is at a different elevation from the common elevation of the contiguous panels of its respective wall, and wherein two walls of each of the superheater, steam generator, and reheater each have adjacent inlet headers of all panels including the corner panels and the contiguous panels at the common elevation thereof.

13. A boiler as recited in claim 7, wherein all of the panels of two opposed walls of each of the superheater, steam generator, and reheater, including corner panels and contiguous panels, have inlet headers at a first common elevation.

14. A boiler as recited in claim 13, wherein all of the panels of two opposed walls of each of the superheater, steam generator, and reheater, including corner panels and contiguous panels, have inlet headers at a second common elevation that is different from the first common elevation.

* * * * *